United States Patent
Larson et al.

(10) Patent No.: US 9,836,436 B2
(45) Date of Patent: Dec. 5, 2017

(54) SYSTEMS, METHODS, SOFTWARE AND INTERFACES FOR PERFORMING ENHANCED DOCUMENT PROCESSING AND DOCUMENT OUTLINING

(75) Inventors: Craig Alan Larson, Minneapolis, MN (US); Kevin Scott Koch, Grand Junction, CO (US); David Wayne DeMoss, Minneapolis, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 466 days.

(21) Appl. No.: 12/979,867

(22) Filed: Dec. 28, 2010

(65) Prior Publication Data

US 2012/0166924 A1 Jun. 28, 2012

Related U.S. Application Data

(60) Provisional application No. 61/400,984, filed on Aug. 5, 2010.

(51) Int. Cl.
*G06F 17/00* (2006.01)
*G06F 17/22* (2006.01)
(Continued)

(52) U.S. Cl.
CPC ...... *G06F 17/2229* (2013.01); *G06F 17/2241* (2013.01); *G06F 17/241* (2013.01);
(Continued)

(58) Field of Classification Search
CPC ...... G06F 17/24; G06F 3/1454; G06F 3/0486; G06F 17/2229
(Continued)

(56) References Cited

U.S. PATENT DOCUMENTS 6,944,821 B1 * 9/2005 Bates et al. ............. 715/209
7,003,719 B1 * 2/2006 Rosenoff et al. ......... 715/205
(Continued)

FOREIGN PATENT DOCUMENTS

CA 2807479 A1 2/2012
EP 2601597 A1 6/2013
(Continued)

OTHER PUBLICATIONS

International search report and Written Opinion issued in corresponding PCT Application No. PCT/US2011/046606, dated Oct. 11, 2011, 8 pages.
(Continued)

*Primary Examiner* — Quoc A Tran

(57) ABSTRACT

An exemplary method includes accessing a source document where the source document is associated with a citation and copying a selected portion of the source document. Then, in response to copying the selected portion, the method includes generating a referenced element where the referenced element consists of the selected portion and a hyperlink associated with the citation. Finally, the method includes accessing a destination document and inserting the referenced element into the destination document. An additional exemplary method further includes storing a copy of the referenced element in a memory of an access device. Another exemplary method includes annotating the destination document and generating an annotated destination document. Another exemplary method includes printing, within a single print session, the annotated destination document and the source document. Yet another exemplary method includes printing, within a single print session, a non-annotated destination document, the annotated destination document and the source document.

14 Claims, 20 Drawing Sheets

(51) Int. Cl.
  *G06F 17/30* (2006.01)
  *G06Q 10/10* (2012.01)
  *G06F 3/0486* (2013.01)
  *G06F 3/14* (2006.01)
  *G06F 17/21* (2006.01)
  *G06F 17/24* (2006.01)

(52) U.S. Cl.
  CPC .......... *G06F 3/0486* (2013.01); *G06F 3/1454* (2013.01); *G06F 17/211* (2013.01); *G06F 17/2247* (2013.01); *G06F 17/24* (2013.01); *G06F 17/30014* (2013.01); *G06F 17/30882* (2013.01); *G06F 17/30899* (2013.01); *G06Q 10/10* (2013.01)

(58) Field of Classification Search
  USPC .......... 715/724, 201–209, 769–771
  See application file for complete search history.

(56) References Cited

U.S. PATENT DOCUMENTS

| | | | | |
|---|---|---|---|---|
| 7,191,400 B1* | 3/2007 | Buvac et al. | ................ | 715/205 |
| 7,877,460 B1* | 1/2011 | Brouwer | ................ | G06Q 10/10 709/205 |
| 2003/0009489 A1* | 1/2003 | Griffin | ................ | 707/500 |
| 2003/0229858 A1* | 12/2003 | Keohane et al. | ............. | 715/526 |
| 2004/0054627 A1* | 3/2004 | Rutledge | ................ | 705/50 |
| 2004/0139400 A1* | 7/2004 | Allam et al. | ................ | 715/526 |
| 2005/0154993 A1* | 7/2005 | Chen et al. | ................ | 715/770 |
| 2006/0218492 A1* | 9/2006 | Andrade | ................ | 715/523 |
| 2007/0288256 A1* | 12/2007 | Speier | ................ | 705/1 |
| 2007/0300143 A1* | 12/2007 | Vanderport et al. | .......... | 715/500 |
| 2008/0082929 A1* | 4/2008 | Stignani | ................ | G06Q 10/06 715/764 |
| 2008/0163039 A1* | 7/2008 | Ryan et al. | ................ | 715/206 |
| 2008/0239413 A1 | 10/2008 | Vuong et al. | | |
| 2009/0287988 A1* | 11/2009 | Cohen | ................ | G06F 9/543 715/204 |
| 2010/0058176 A1* | 3/2010 | Carro et al. | ................ | 715/256 |
| 2012/0240024 A1* | 9/2012 | Williamson et al. | ......... | 715/227 |

FOREIGN PATENT DOCUMENTS

| | | | | |
|---|---|---|---|---|
| WO | WO 2008/027477 A3 * | 3/2008 | ............... | G06F 9/46 |
| WO | 2012/019013 A1 | 2/2012 | | |

OTHER PUBLICATIONS

International Preliminary Report on Patentability and Written Opinion issued in corresponding PCT Application No. PCT/US2011/046606, dated Feb. 14, 2013, 7 pages.

* cited by examiner

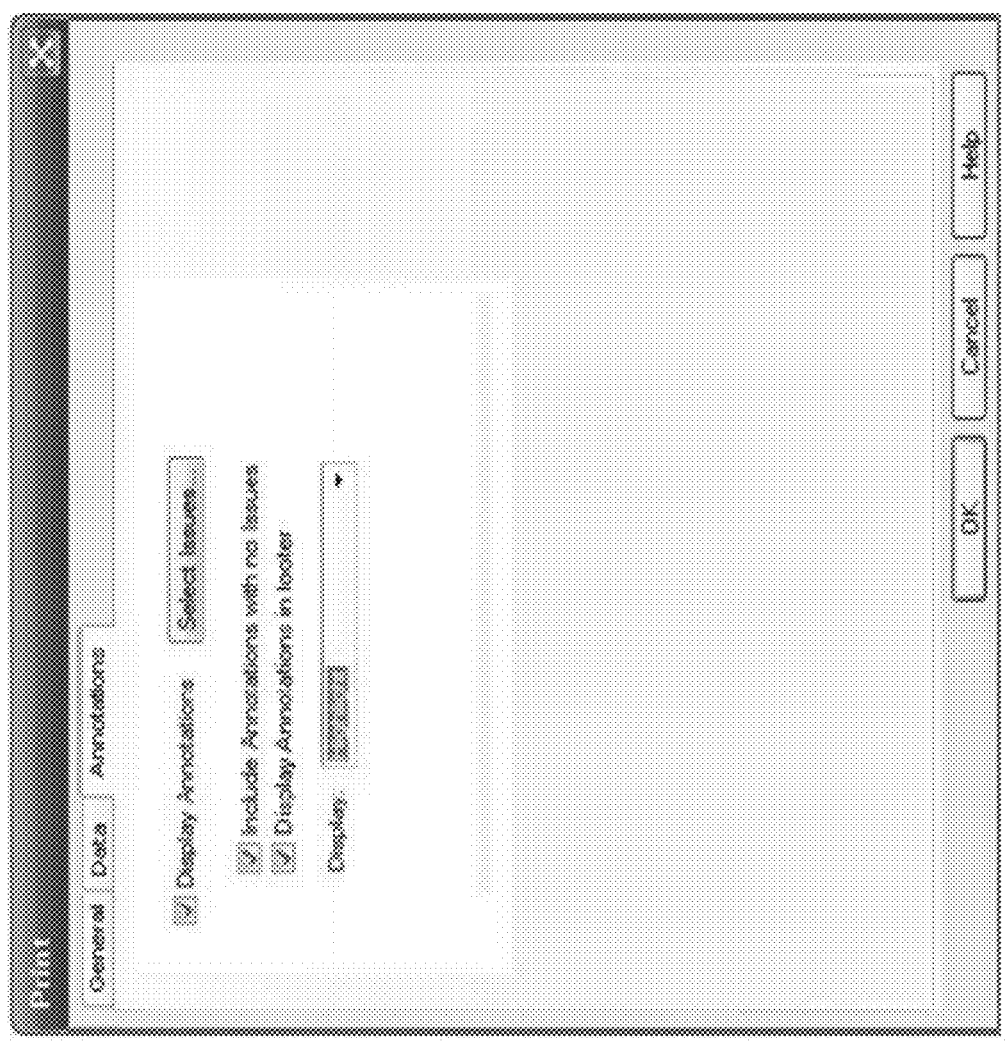

FIGURE 14

SYSTEMS, METHODS, SOFTWARE AND INTERFACES FOR PERFORMING ENHANCED DOCUMENT PROCESSING AND DOCUMENT OUTLINING

RELATED APPLICATIONS

This application claims priority to U.S. Provisional Application 61/400,984 which was filed Aug. 5, 2010 and is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright© 2010 Thomson Reuters.

TECHNICAL FIELD

Various embodiments of the present invention concern processing of data and related information for preparing documents and tools, such as outlines, in the context of performing professional work related functions.

BACKGROUND

With the advents of the printing press, typeset, typewriting machines, computer-implemented document processing and mass data storage, the amount of information generated by mankind has risen dramatically and with an ever quickening pace. As a result, there is a continuing need to collect, store, identify, track, classify, catalogue, link, retrieve and/or distribute this growing sea of information.

Within many areas and industries, including the legal industry, there are content and enhanced experience providers, such as THOMSON REUTERS® Corporation. These providers identify, collect, analyze and process the growing sea of information for use in generating content, such as law related reports, articles, etc., for consumption by professionals and others involved in their respective industries. Therefore, these providers are continually looking for products and services to help subscribers, clients and customers distinguish themselves over the competition. Moreover, such providers strive to create enhancement tools, including search and ranking tools, to enable clients to process only relevant information and to make informed decisions.

In particular, for example, legal professionals in the U.S. and abroad are often involved in litigation, arbitration, mediation, administrative proceedings and/or other evidentiary processes wherein a large amount of information is collected. For instance, in a litigation matter there are often numerous depositions in which several thousands of pages of recorded, videotaped, and transcribed testimony are accumulated. There is a constant need in the legal community to efficiently and effectively create, track, edit, search, access and/or use voluminous materials and information when providing legal services.

Currently, known enhancement tools help a professional create, track, edit, search, access and use voluminous materials and information to stay competitive within the industry. First, MICROSOFT® Windows Explorer allows a user to create and organize electronic files into folders so that a user can easily find the file once he/she wants to retrieve it later. Second, document processing applications such as MICROSOFT® Word and WORDPERFECT® enable users to create, save, modify and print an electronic document.

For example, MICROSOFT® Word and WORDPERFECT® permit a user to use copy and paste and/or cut and paste functionalities on selected text. The copy and paste functionality allows a user to duplicate the selected text and insert that selected text within the current document or another document. The cut and paste functionality allows a user to remove the selected text and insert that selected text within the current document or another document. Another useful, but separate, function, from above listed functionalities, is the ability to insert a hyperlink within a document. The hyperlink, when selected, navigates the user to another document, website and/or location. Yet another function within a document processing application is the ability to create outlines.

In continuing with the legal professional example, attorneys use outlines at various stages of litigation (e.g. depositions, witness preparation, and/or trial). For instance, an attorney preparing for trial often prepares an outline for questioning a witness. During preparation, the attorney and/or paralegal typically pour through the deposition transcripts and videotapes associated with the trial witness, as well as other deponents, to identify areas of questioning and/or past responses. Additionally, the attorney's outline attempts to identify, collect and incorporate a vast collection of pleadings, documents, exhibits, and other information. This vast collection may be used for trial planning, for fast, effective reference, and for possible presentation during trial. For instance, during trial, the attorney needs to be able to quickly reference the past testimony of the witness and others, as well as locate and submit exhibits to assist in the questioning and presentation of evidence. Being able to quickly reference the aforementioned items gives the attorney an edge. For example, the attorney may use those previous statements and/or exhibits to discredit the witness in front of a jury or other fact finder. When drafting that outline, the attorney, most likely, utilizes the copy and paste and/or cut and paste function several times. The attorney may even be inclined to perform a separate function of inserting a hyperlink into the outline. However, there are several times while creating an outline where an attorney wants to copy/paste a set of selected text into the outline but also wants to have a link back to the source document in case the attorney needs to reference the selected text during, for example, a deposition. Current document processing applications do not provide this type of simultaneous functionality of pasting the selected text from a source document along with a hyperlink back to the source document into the deposition outline.

Additionally, an attorney may also want to annotate an outline. Once the attorney has completed the outline, he/she may want to print, within the single print session, two versions of the deposition outline, an annotated version and a non-annotated version. Current document processing applications only allow for printing either the annotated or the non-annotated version, then switching views and printing the opposite version in a second print session.

Accordingly, the inventors have recognized the necessity for additional improvements in providing outline and print functionality for electronic documents.

SUMMARY

An exemplary method includes accessing a source document where the source document is associated with a citation and copying a selected portion of the source document. Then, in response to copying the selected portion, the method includes generating a referenced element where the referenced element consists of the selected portion of the source document and a hyperlink associated with the citation. Finally, the method includes accessing a destination document and inserting the referenced element into the destination document.

An additional exemplary method further includes storing a copy of the referenced element in a memory of an access device. Another exemplary method includes annotating the destination document and generating an annotated destination document. Another exemplary method includes printing, within a single print session, the annotated destination document and the source document. Yet another exemplary method includes printing, within a single print session, a non-annotated destination document, the annotated destination document and the source document. In a further exemplary method, the source document and the destination document are accessed via a document processing application. In an additional exemplary method, the document processing application is MICROSOFT® Word. In another exemplary method, the selected portion is the source document. In an exemplary method, the source document is a transcript, the selected portion of the source document comprising a portion of the transcript associated with at least one question, and the destination document is an outline document. In an additional exemplary method, the source document is a transcript, the selected portion of the source document comprising a portion of the transcript associated with at least one question/answer pair, and the destination document is an outline document. In another exemplary method, wherein the source document is an image, the selected portion of the source document is a portion of the image, and the destination document is an outline document. In addition, system and computer usable medium embodiments are also disclosed.

The system, method, computer usable medium and interfaces described herein advantageously generate a referenced element that includes the selected portion of the source document and the hyperlink corresponding to the citation immediately upon electing to copy a portion of the source document. Source documents can be transcripts, exhibits, images, documents, pleadings, annotation text, questions and answers from transcripts, and electronic outlines. In one embodiment, upon election, the referenced element is inserted into an outline.

The present invention may be used in litigation support ("LS") software, such as Case Notebook™ (a product by West, a THOMSON REUTERS® business). Exemplary embodiments operate within the LS software to construct outlines of cases and to perform other enhanced functions. Although discussed in terms of these systems, it is understood that the invention is not limited to such implementations and applies to any suitable LS software and broadly to such professional services provider systems. For instance, Case Notebook™ is a software program that helps attorneys keep all case-related documents in one place while they perform all the necessary parts of litigation. Built on West's LiveNote™ platform, Case Notebook™ easily integrates with WESTLAW®. Any research done on WESTLAW® can be moved into a Case Notebook™ file, where users can annotate, search and report on the research and other documents.

Additionally, exemplary embodiments of the present invention have the capability to print, within the single print session, two versions of an outline, an annotated version and a non-annotated version. For example, the attorney would retain the annotated version of the deposition outline and distribute the non-annotated version of the deposition outline to opposing counsel.

Moreover, these advantages and others described herein fulfill the need in the legal community to efficiently and effectively create, track, edit, search, access and use voluminous materials and information, particularly in the litigation support area.

BRIEF DESCRIPTION OF THE DRAWINGS

FIG. 11 is an exemplary interface used in the invention.
FIG. 13 is an exemplary interface used in the invention.
FIG. 13B is an exemplary interface used in the invention.
FIG. 14 is an exemplary outline generated by the invention.

DETAILED DESCRIPTION OF THE EXEMPLARY EMBODIMENT(S)

This description, which incorporates the figures and the claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Document Processing and Information Retrieval System

Figure 1:
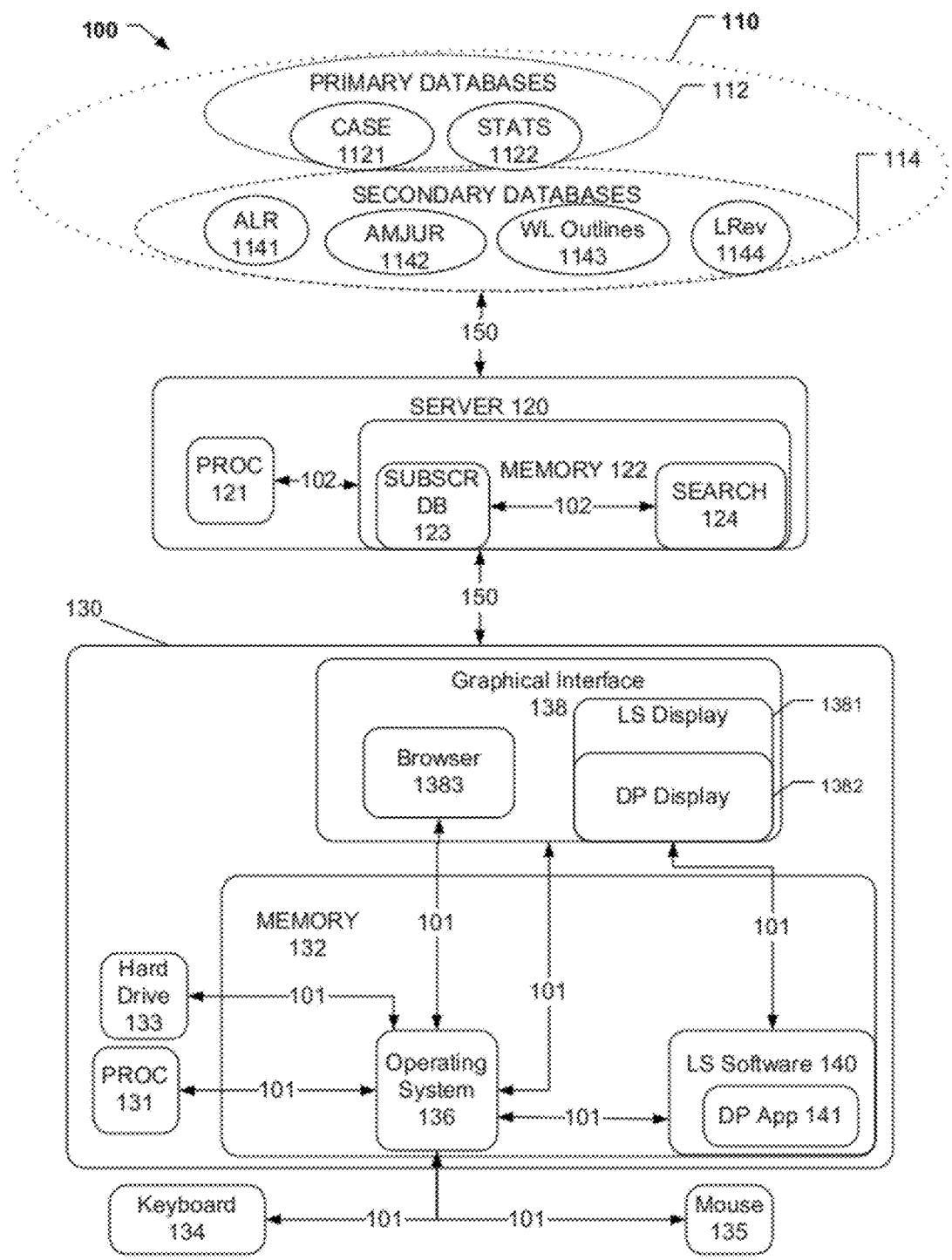
FIG. 1 is an exemplary system of the invention.

FIG. 1 shows an exemplary system 100, which may be adapted to incorporate the capabilities, functions, methods, and interfaces of the present invention. System 100 includes databases 110, a server 120, and an access device 130.

Access device 130 is generally representative of one or more access devices. In the exemplary embodiment, access device 130 takes the form of a personal computer, workstation, personal digital assistant, mobile telephone, and/or any other device capable of providing an effective user interface with a server and/or database. Specifically, access device 130 includes a graphical interface 138, a processor module 131, a memory 132, a hard drive 133, a keyboard 134, and a graphical pointer/selector (e.g. mouse) 135. All of these elements are connected via computer bus 101, which is shown in various pathways throughout the access device 130. Computer buses 101 and/or 102 are subsystems that transfer data between the access device's components/elements and/or between multiple access devices.

Processor module 131 includes one or more processors, processing circuits, and/or controllers. In the exemplary embodiment, processor module 131 takes any convenient and/or desirable form known to those skilled in the art. Coupled, via computer bus 101, to processor module 131 is memory 132.

A computer readable litigation support software 140 (herein also referred to as "LS software") is stored in memory 132 (e.g. RAM) and/or hard drive 133. Memory 132 and hard drive 133 are examples of main memory and secondary memory, respectively. Some exemplary embodiments have the LS software 140 being stored in a computer-readable medium product of any type. In this document, the terms "computer program medium," "computer usable medium," and "computer readable medium" may generally refer to media such as main memory, secondary memory, removable storage drive, and/or a hard disk installed in a hard disk drive. The computer readable medium, for example, may include non-volatile memory, such as floppy, ROM, flash memory, disk drive memory, CD-ROM, CD-optical drive or disc and/or other permanent storage. Additionally, a computer readable medium may include, for example, volatile storage such as RAM, buffers, cache memory, and/or network circuits. The computer readable medium allows the processor 131 to read data, instructions, messages or message packets, and other computer readable information from the computer readable medium.

In one exemplary embodiment, memory 132 stores code (machine-readable or executable instructions) for an operating system 136 and LS software 140. Operating system 136 is coupled to a browser 1383 and graphical interface 138, via computer bus 101. In the exemplary embodiment, operating system 136 takes the form of aversion of the MICROSOFT® Windows operating system, and browser 1383 takes the form of a version of MICROSOFT® INTERNET EXPLORER®. In addition, operating system 136 interacts, via computer bus 101, with the keyboard 134, the mouse 135, the processor 131, the hard drive 133, and the LS software 140. For example, the keyboard 134 and/or the mouse 135 send inputs, via computer bus 101, to the operating system 136. The operating system 136 determines that the LS software 140 is active, accepts the LS software input as data and stores that data temporarily in memory 132 (e.g. RAM). Each instruction from the LS software 140 is sent by the operating system 136, via computer bus 101, to the processor 131. These instructions are intertwined with instructions from other programs that the operating system 136 is overseeing before being sent to the processor 131. Operating system 136 and browser 1383 not only receive inputs from keyboard 134 and selector 135, but also support rendering of graphical user interfaces within graphical interface 138.

Graphical interface 138 includes a browser 1383, a litigation support (LS) display 1381, and a document processing (DP) display 1382. When launching of the LS software 140 and/or document processing application (herein also referred to as "DP app") 141, a LS display 1381 and a DS display 1382 is defined in memory 132 and rendered on graphical interface 138. Upon rendering, the graphical interface 138 presents the data in association with the set of instructions from the LS software 140 as further discussed herein the context of the exemplary interfaces. Although FIG. 1 shows browser 1383, LS display 1381 and DP display 1382 as having the ability to display simultaneously, in operation, some embodiments may present them at separate times.

In an exemplary embodiment, LS software 140 includes and is integrated with at least one DP app 141 (e.g., MICROSOFT® Word (document) processing, PowerPoint presentation, Excel spreadsheet, and Outlook email software). In some embodiments, the document processing application 141 that is integrated with LS software 140 is an independent application from the access device's document processing application. For example, the LS software 140 may have an integrated document processing application 141 with similar functionality to MICROSOFT® Word; however, the access device 130 also has MICROSOFT® Word installed as a separate, independent document processing application. In additional embodiments, the LS software 140 and/or document processing application 141 may be downloaded from server 120 via a signal transmission channel 150 over a wireless or wireline communications network (not shown). The LS software 140 executes a set of instructions, from memory 132.

Figure 1A:
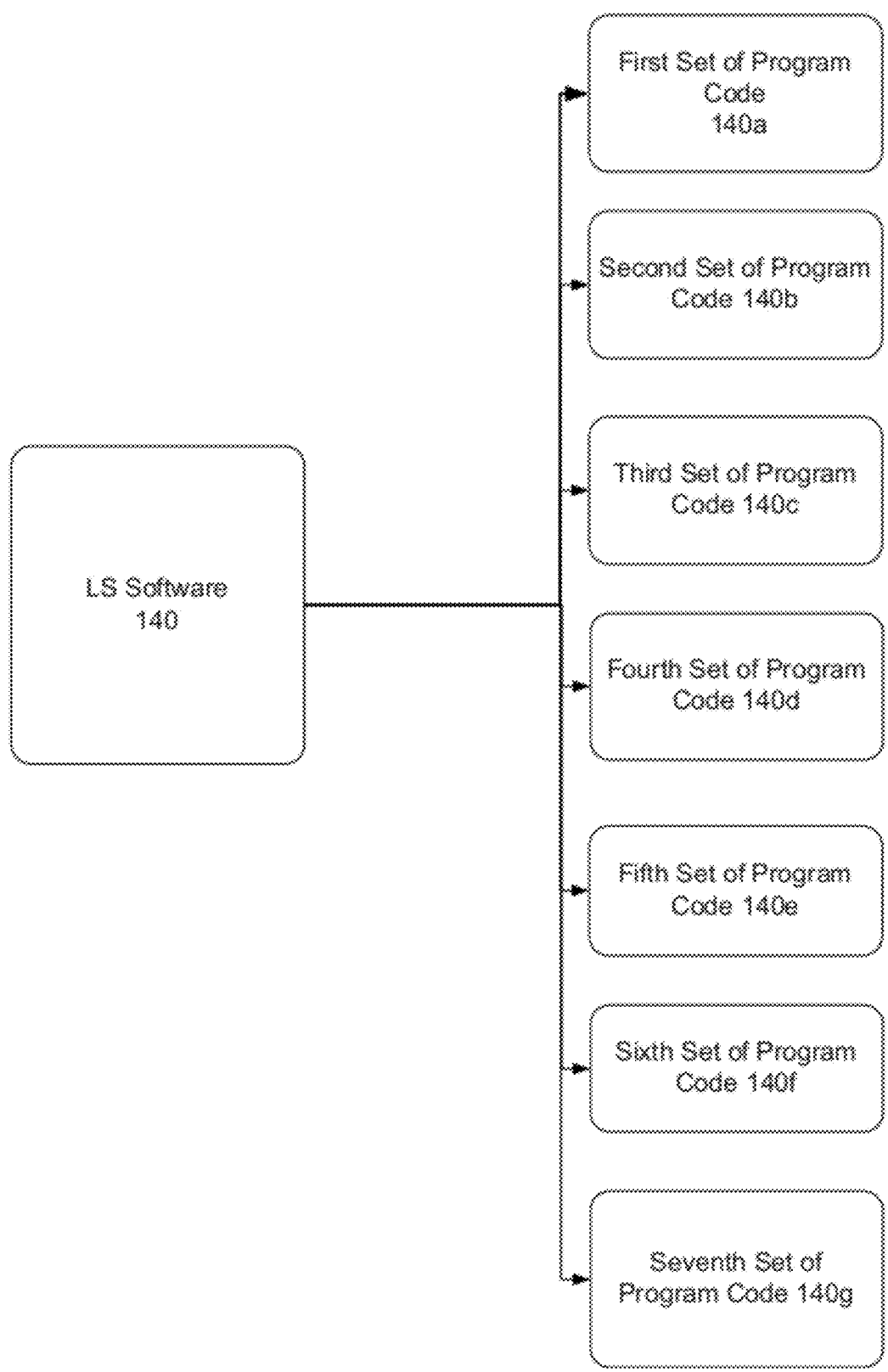
FIG. 1A is exemplary LS software used in the invention.

FIG. 1A illustrates an exemplary embodiment of a set of instructions (i.e. program code) for the LS software 140 and/or DP app 141. A first set of computer program code 140*a* is adapted to copy a selected portion of a source document. A second set of computer program code 140*b*, responsive to the first set of computer program code, is adapted to generate a referenced element wherein the referenced element includes the selected portion of the source document and a hyperlink associated with the citation. The third set of computer program code 140*c* is adapted to insert the referenced element into a destination document. The fourth set of computer program code 140*d* is adapted to store a copy of the referenced element to a memory location of an access device 130. The fifth set of computer program code 140*e* is adapted to annotate the destination document. The sixth set of computer program code 140*f* is adapted to print, within the single print session, an annotated destination document and the source document. The seventh set of computer program code 140*g* is adapted to print, within the single print session, a non-annotated destination document, an annotated destination document and the source document. Examples of these instructions are further described herein.

Referring back to FIG. 1, server 120 is generally representative of one or more servers for serving data in the form of a webpage or other markup language with associated applets, ActiveX controls, and/or other related software and data structures. In addition, server 120 generates a signal transmission channel 150 over a wireless or wireline communications network (not shown) to at least one access device, such as access device 130 and/or to at least one database, such as primary database 112 or secondary database 114. For example, a signal transmission channel 150 may be associated with a query request to search within the primary database 112, more particularly the case law database 1121, for case law to insert into an outline. Another example of a signal transmission channel 150 may be associated with a query request to search within the secondary database 114, more particularly the WESTLAW® (WL) Outlines database 1143, for a WESTLAW® outline to insert into another outline. More particularly, server 120 includes a processor 121, a memory 122, a subscriber database 123, and a search module 124. All these elements are connected via computer bus 102.

Processor 121 includes one or more local and/or distributed processors, controllers and/or virtual machines. In the exemplary embodiment, processor module 121 takes any convenient and/or desirable form known to those skilled in the art. Memory 122 takes the exemplary form of one or more electronic, magnetic, and/or optical data-storage devices and stores a subscriber database 123 and a search module 124.

Subscriber database 123 includes subscriber related data for controlling, administering, and managing pay-as-you-go and/or subscription based access of databases 110. Search module 124 includes one or more search engines and related user interface components, for receiving and processing user queries against one or more of databases 110. In the exemplary embodiment, one or more search engines associated with the search module 124 provide Boolean, term frequency-inverse document frequency (tf-idf), and/or natural language search capabilities. Some embodiments charge an additional fee from the subscription fee, for searching and/or accessing documents from databases 110.

Databases 110 include a set of primary databases 112 and a set of secondary databases 114. Primary databases 112, in the exemplary embodiment, include a case law database 1121 and a statute database 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, include an ALR (American Law Reports) database 1141, an AMJUR (American Jurisprudence) database 1142, a WESTLAW® Outlines (WL Outlines) database 1143, and a law review (LREV) database 1144. Other embodiments may include non-legal databases that include financial, scientific, or health-care information. Still other embodiments provide public or private databases, such as those made available through WESTLAW®, INFOTRAC®, and more generally any open web or internet content. Databases 110 take the exemplary form of one or more electronic, magnetic, and/or optical data-storage devices. Databases 110 are coupled or couplable via a server 120 and a signal transmission channel 150 over a wireless or wireline communications network, such as a local-, wide-, private-, or virtual-private network (not shown), to access device 130.

Exemplary Method as Conducted by System 100

Figure 2:
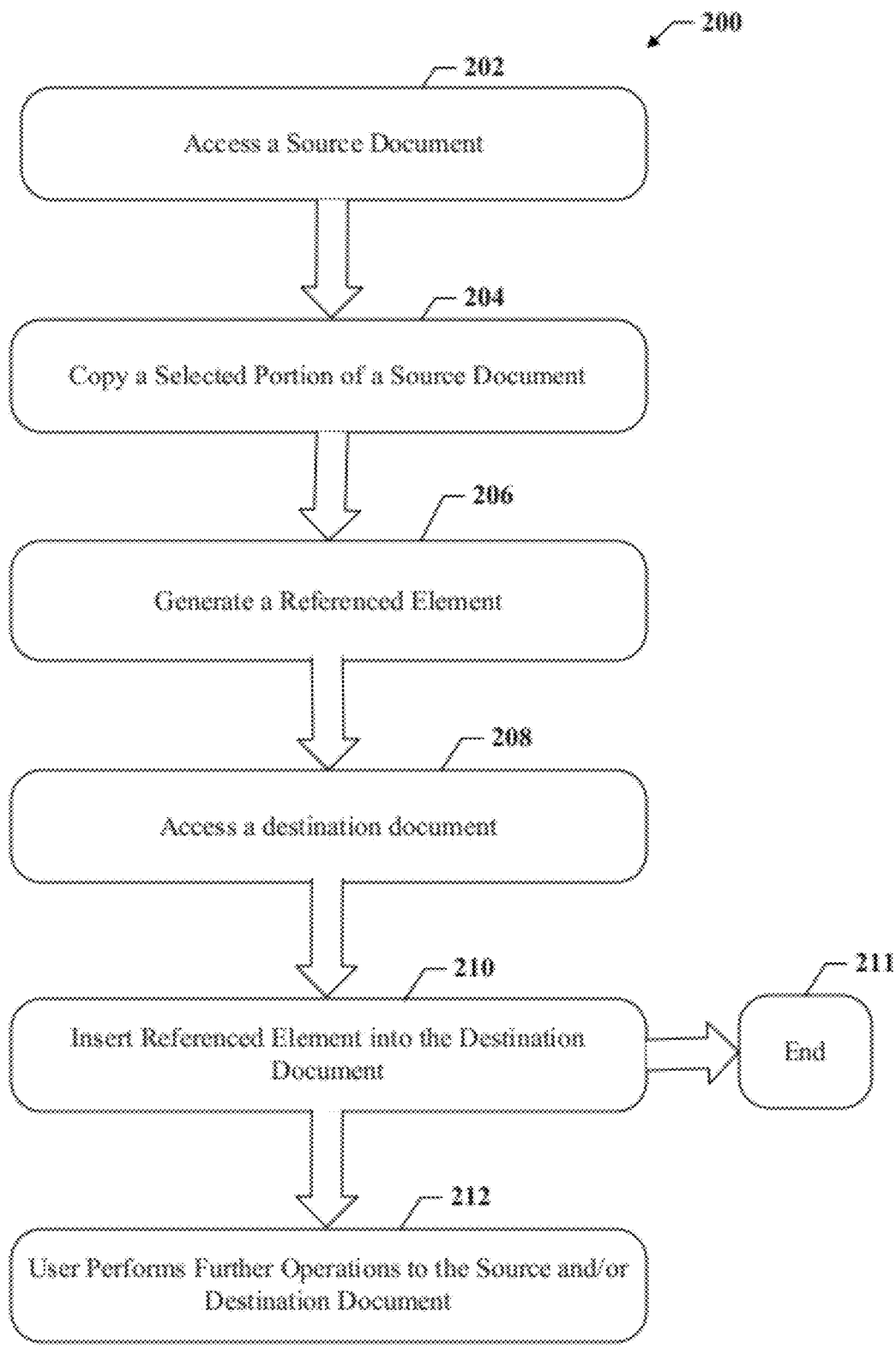
FIG. 2 is an exemplary method of the invention.

Referring now to FIG. 2, system 100 is configured to implement method 200, which may be adapted to incorporate the capabilities, functions, systems, and interfaces of the present invention. Method 200 includes functional blocks 202-212. These functional blocks are steps that perform actions including assignments, decisions, assessments and other like functions.

In step 202, a user accesses a source document via LS software 140, more particularly the document processing application 141, within system 100. Examples of source documents include but are not limited to character reports, exhibits, transcripts, research documentation, documents, images, case law, outlines, pleadings, and other information. Each source document has a corresponding citation. A citation informs a user about a source's authority and/or other relevant information corresponding to the document. For example, a Supreme Court citation may look like this: *Griswold* v. *Connecticut,* 381 U.S. 479, 480 (1965). The names of the parties are Griswold and Connecticut. The case is reported in volume 381 of the United States Reports (abbreviated "U.S."). The case begins on page 479 of that volume of the reporter. The authoritative supporting material for the writer's proposition is on page 480. The authority is from the year 1965. Other citations provide similar functionality in that they provide some guidance to the user about the source document. Additional examples of citations are discussed herein. Once the source document is accessed, the process moves to step 204.

In step 204, the user then selects a portion of the source document. The selected portion may be the entire content of the source document or just a portion thereof. One exemplary portion selection includes selection of a transcript question(s). Another exemplary portion selection includes selection of a transcript question/answer pair. Yet another exemplary portion selection includes selection of an image. These and other exemplary portion selections are further illustrated herein. After the portion of the source document is selected, the user copies the selected portion of the source document and the process proceeds to step 206.

In step 206, as the user copies the selected portion of the source document, a referenced element is generated. The referenced element includes the selected portion of the source document and a hyperlink associated with the citation. Examples of referenced elements are shown in FIGS. 3, 6A, 7A, 11, and 14. Preferably a copy of the referenced element is stored within the memory 132 of the access device 130. Once the referenced element is generated, the process advances to step 208.

In step 208, the user then accesses a destination document via LS software 140, more particularly the document processing application 141, within system 100. The document processing application 141 may be the same or a separate document processing application than the one used to access the source document. One example of a destination document is an outline. Exemplary outlines include but are not limited to deposition, expert, witness, and/or trial outlines. Once the destination document is accessed, the process executes step 210.

In step 210, the copied referenced element is inserted into the destination document through the paste functionality of the document processing application 141. Put another way, the copy of the referenced element that is stored in the memory 132 of the access device 130 now moves from that memory location to the destination document. The basic functionality of copy and paste is known to those skilled in the art. However, the referenced element that includes the selected portion of the source document and the hyperlink corresponding to the citation is not known to those skilled in the art as these referenced elements are generated immediately upon electing to copy a portion of the source document. Once the referenced element is inserted, the user may choose to end the process at block 211 or continue to step 212 for additional functionality.

In step 212, the user may choose to perform further operations to the destination document. Exemplary operations may include the following: annotating the destination and/or source document; printing, in the single print session, an annotated version of the destination document and source documents); and/or printing, in the single print session, a non-annotated version of the destination document, an annotated version of the destination document and the source document(s). Further examples of annotating and printing are described herein.

Exemplary Interfaces

FIGS. 3-14 show exemplary interfaces for system 100 and method 200, which may be adapted to incorporate the capabilities, functions, systems and methods of the present invention. Within the present invention, exemplary destination documents include user created outlines, with the exception of WESTLAW® outlines (refer to FIG. 5 and the corresponding description). In addition, exemplary source documents include potentially all other documents, including WESTLAW® outlines.

Figure 3:
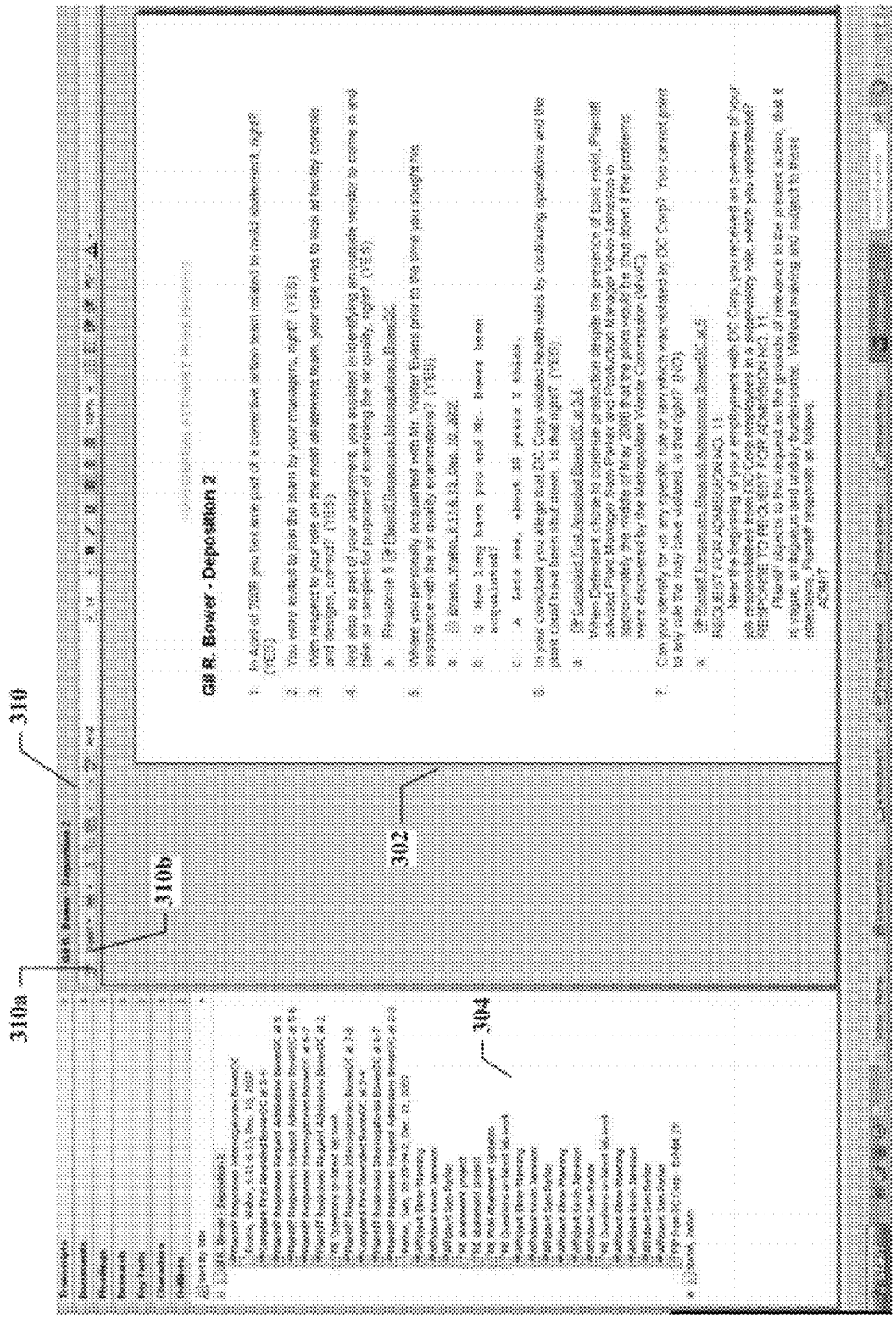
FIG. 3 is an exemplary interface used in the invention.
Figure 3A:
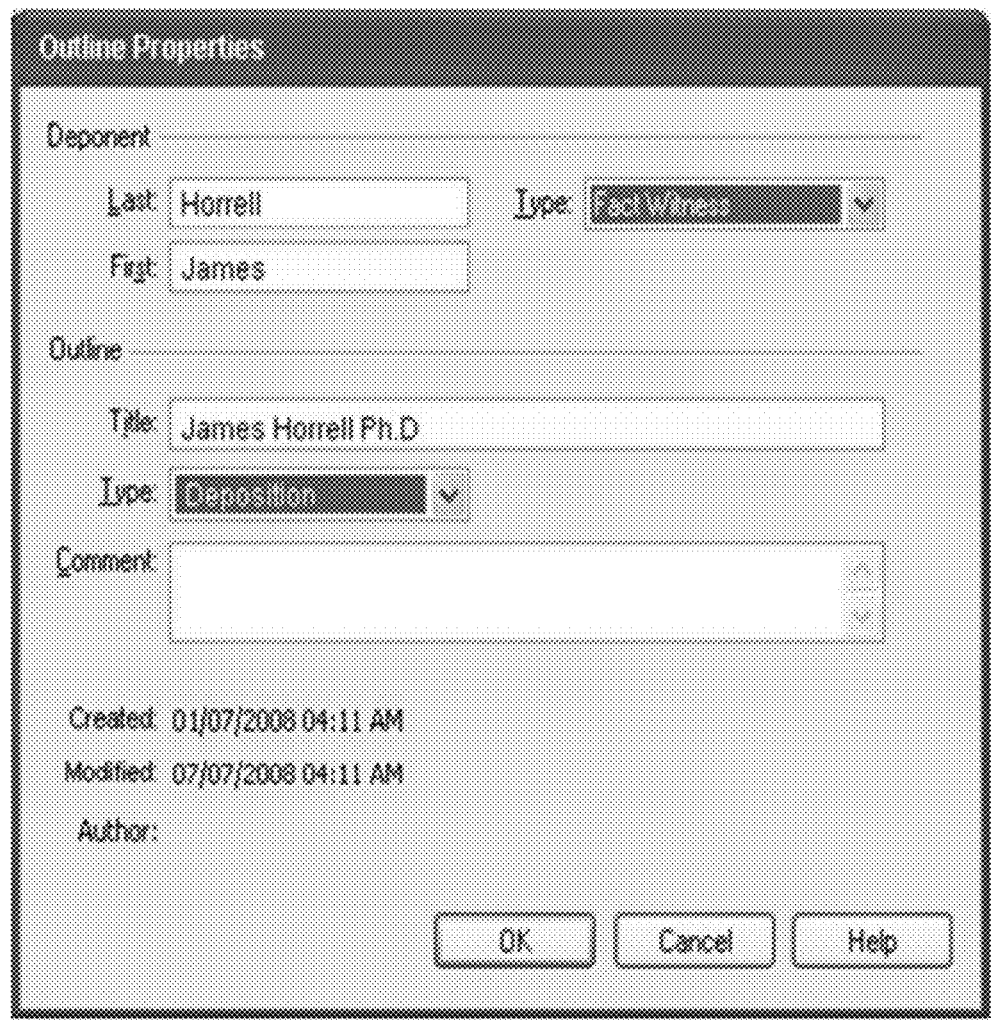
FIG. 3A is an exemplary interface used in the invention.

FIG. 3 illustrates a display pane 302, a navigation pane 304 and toolbar 310. All the functions performed from the toolbar 310 pertain only to the display pane 302. Put another way, a user cannot copy text from the display pane 302 and paste it into a transcript (i.e., a source document). The properties button 310a displays the properties dialog box, FIG. 3A. When creating a new character (e.g., a new trial witness) for an outline, the properties dialog box prompts a user to enter the first and last name as well as the type of the deponent character. The deponent type drop down allows the user to select from the following: fact witness, expert, or other. A title for the outline is also entered in the properties dialog box. The outline type drop down lets the user select from the following: deposition, trial, or other for the type of outline for this deponent. The comment section permits the user to enter any additional comments that are necessary for this particular deponent.

Referring back to FIG. 3, if a user wants to utilize the insert button 310b option from the toolbar 310, the insert drop down displays the following options: insert potential exhibits, insert transcript questions, and/or insert WESTLAW® outline. Each insert option is discussed in further detail later in the specification.

Other toolbar 310 options include but are not limited to print, print preview, cut, copy, paste, undo, redo, spell check, font type, font size, bold, italic, underline, text positioning, zoom, numbered outline, bullet outline, highlight color and/or font color. The print drop down allows the user to print and/or print preview the outline. The cut option cuts the selected text, including hyperlinks, and copies it to the clipboard. The copy option copies the selected text, including hyperlinks, to the clipboard. The paste option pastes the clipboard item to the location of the cursor in the outline display pane 302. The undo option undoes the previous task(s) performed in the outline. The redo option redoes the previous task(s) performed in the outline. The spell check option performs a spell check on the outline. The font drop down displays a list of available system fonts. The font number allows for selecting and/or typing a font size. The bolding option takes the selected text and bolds it. The italic option italicizes the selected text. The underline option underlines the selected text. The text positioning options include left-justify, center and right-justify the selected text. The zoom drop down allows a user to select percentages (e.g. 87%, 100%, 125%, 150%, and 200%). The numbered outline numbers the outline according to the user's numbered outline selection. The bullet outline places bullets in the outline according to the user's bullet outline selection. The highlight color option allows the user to select a highlight color based on a color palette. The font color option allows a user to select font color from a palette like the one above.

Figure 4:
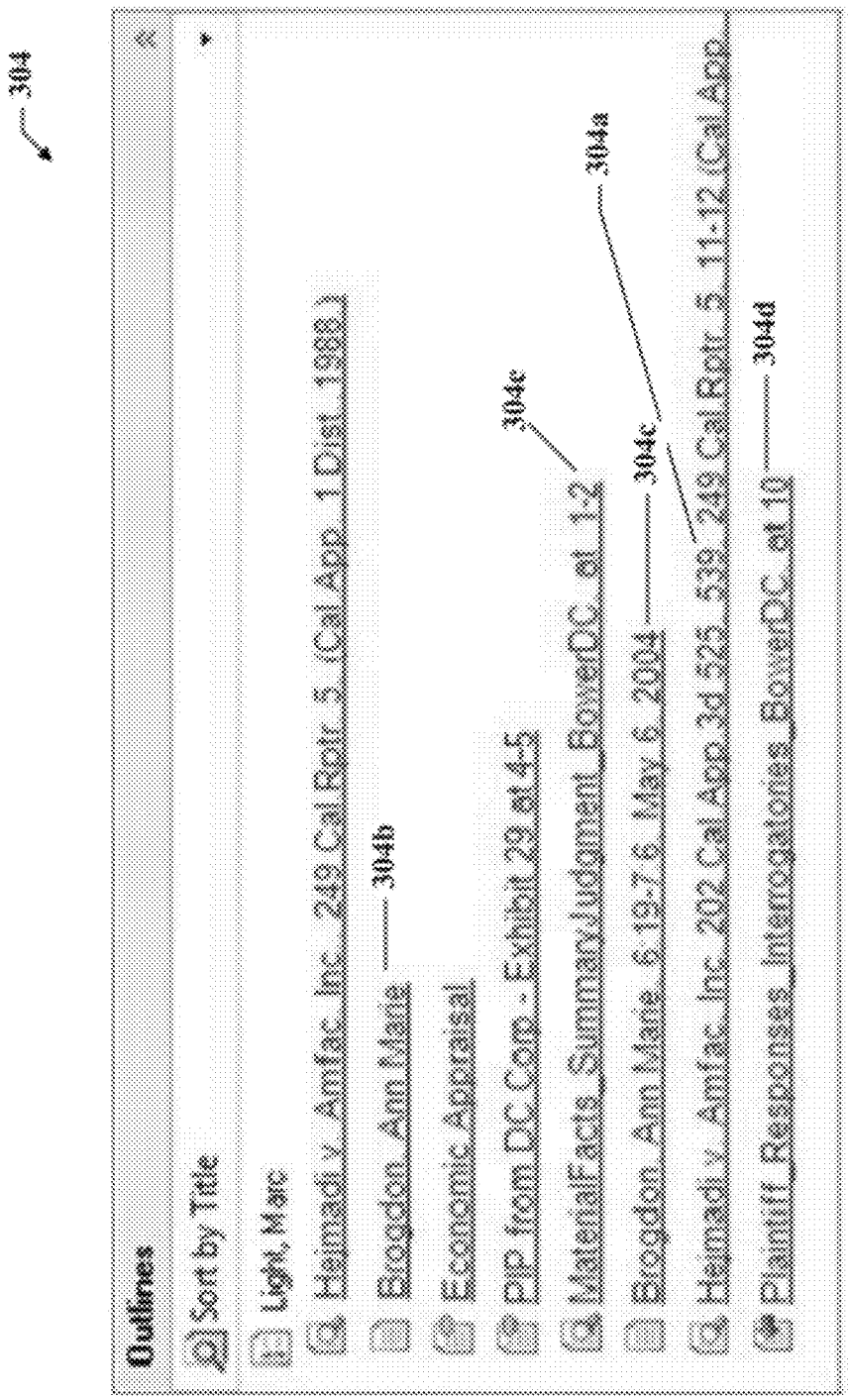
FIG. 4 is an exemplary interface used in the invention.

To the left of the display pane 302, a navigation pane 304, FIG. 4, displays a listing of documents that are inserted within the corresponding outline. The documents listed in the navigation pane 304 determine what is available for print with the outline. By double-clicking the name of the outline (in this example "Light, Marc"), the "Light, Marc" outline opens in the display pane 302. Clicking the sort drop down allows for sorting by title, date, and reverse date in ascending or descending order. For transcripts, documents, pleadings and research, the individual names in the navigation pane 304 are sorted by their order in the outline. If the outline is open in the display pane 302, clicking on a document in the navigation pane 304 navigates to the location of the hyperlink associated with the citation in the outline. If the outline is not open in the display pane 302, double-clicking a document in the navigation pane 304 navigates to the location of the hyperlink associated with the citation in the outline. Right-clicking a document in the navigation pane 304 opens a context menu (not shown): "Open Item" and "Go to Link in Outline." The "Open Item" option opens the document. For example, right-clicking a document hyperlink and selecting "Open Item" opens the document. The "Go to Link in Outline" navigates to the location of the hyperlink associated with a citation in the outline.

In FIG. 4, there are several exemplary types of hyperlinks associated with citations of source documents. For example, when inserting potential exhibits or transcript questions, only the document name displays in the navigation pane 304 (for example, "Brogdon, Ann Marie" 304b). Another display example includes sending an excerpt from a pleading. In this example, the pleading title and the page range of the excerpt are displayed ("Plaintiff_Responses_Interrogatories_BowerDC, at 10" 304d). Another example includes sending selected text from a transcript. In this example, the transcript title, page and line range and date are displayed in the navigation pane 304 ("Brogdon, Ann Marie, 6:19-7:6, May 6, 2004" 304c). Yet another example includes sending selected text from Westlaw research. In this example, the research title and star pagination (i.e. publisher's page number) information are displayed in the navigation pane 304 ("Hejmadi v. Amfac, Inc., 202 Cal.App.3d 525, 539" 304a). An additional example includes sending an excerpt from non-Westlaw research. In this example, the research title and the page range of the excerpt are displayed in the navigation pane 304 ("MaterialsFacts SummaryJudgment BowerDC at 1-2" 304e).

In order to create a new outline, the properties dialog box is opened and populated (refer to FIG. 3A) and then the outline opens. An exemplary new outline, FIG. 5, includes the header defaulting to "Confidential Attorney Work Product." The footer defaults to Page 1 of 1. The title from the properties dialog box is placed automatically on the page (Sprtel, Jaclyn in FIG. 5; James Horrell Ph.D in FIG. 3A). A starting number is placed on the page and the cursor is active to the right of the number. A user may open and/or save an outline in any of the following file types: Rich Text Format (*.rtf), Microsoft Word 97-2003 (*.doc), and/or Microsoft Word (*.docx).

Figure 5:
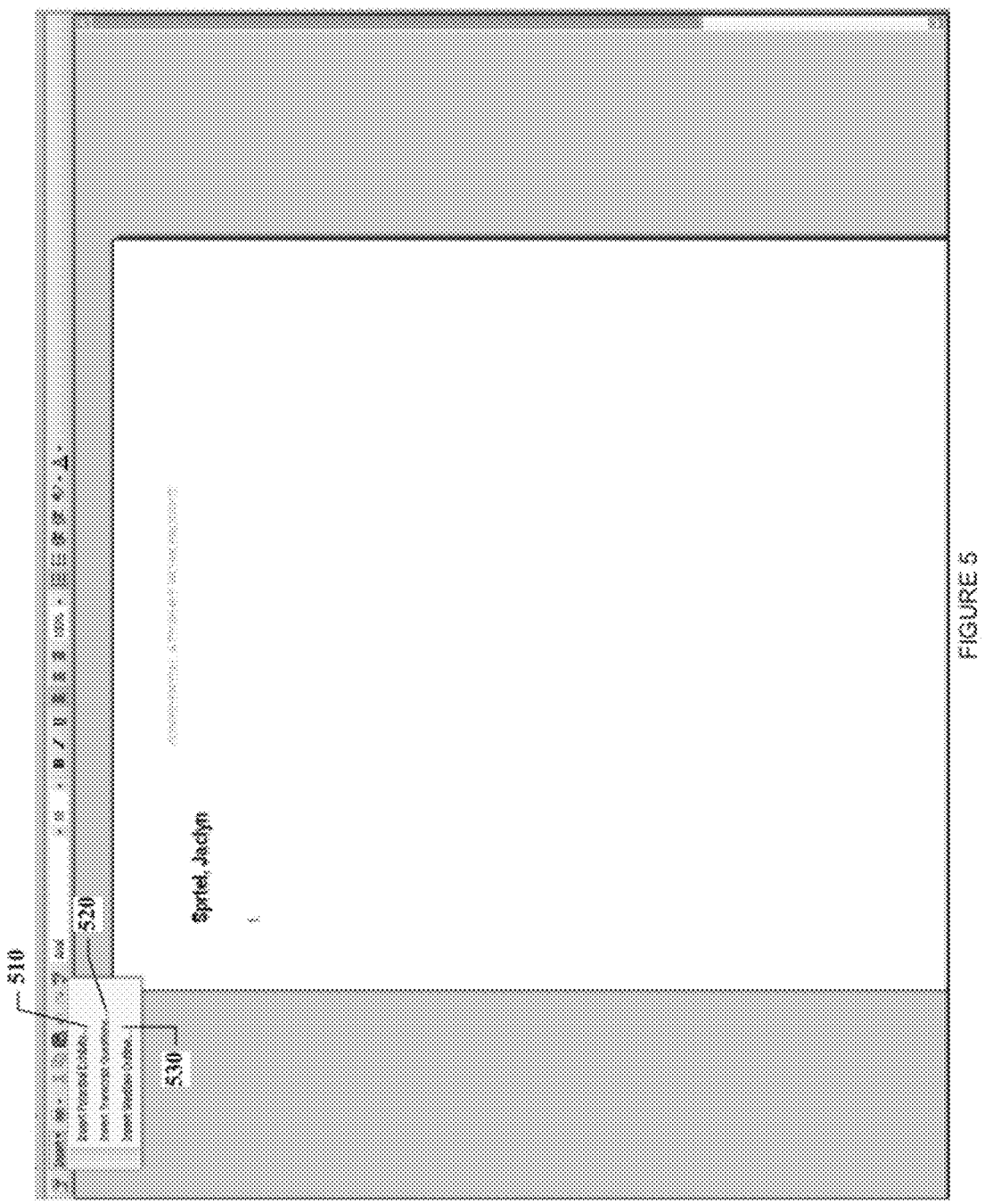
FIG. 5 is an exemplary interface used in the invention.
Figure 6:
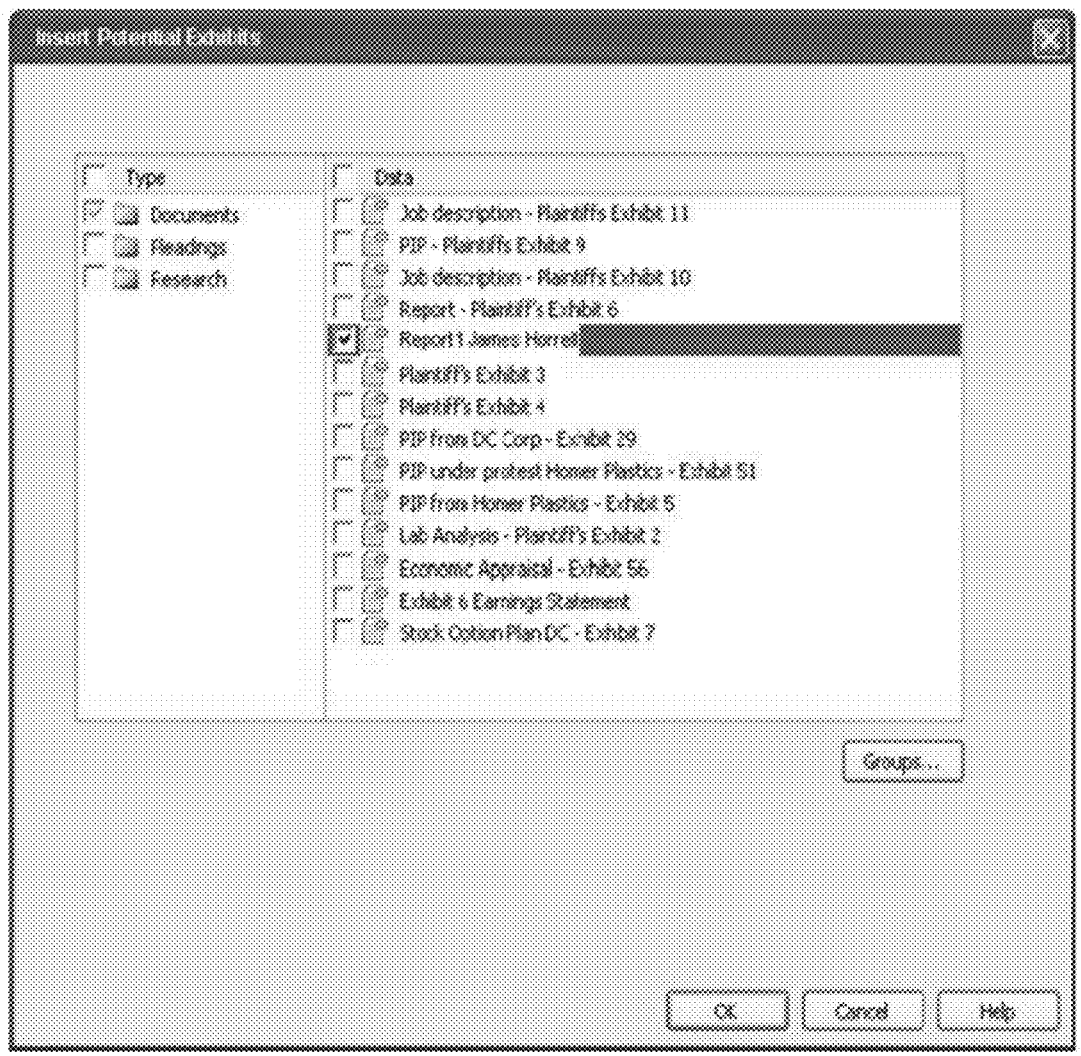
FIG. 6 is an exemplary interface used in the invention.
Figure 6A:
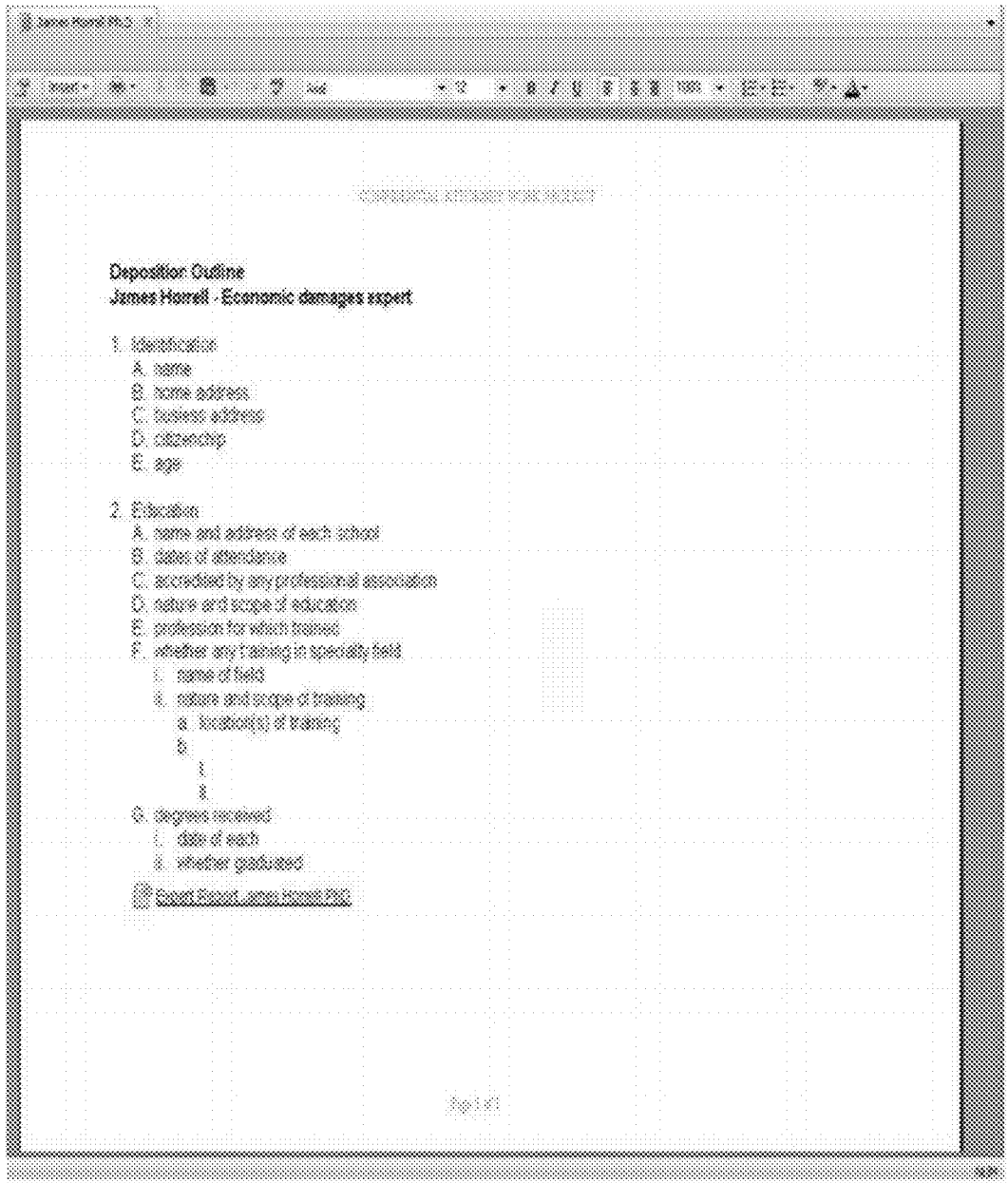
FIG. 6A is an exemplary interface used in the invention.

To insert potential exhibits, a user selects "Insert Potential Exhibits" 510, in FIG. 5. Potential exhibits are any type of document inserted in the display pane 302 as a hyperlink and listed in the navigation pane 304. Once the "Insert Potential Exhibits" 510 is selected, an Insert Potential Exhibits dialog box opens, FIG. 6, The user selects the exhibit type(s) and the corresponding documents in the right data column. No documents are selected by default. A user may select from the following exhibit types: documents, pleadings and/or research. The data displayed in the column are the documents associated with the corresponding exhibit type. For example, the user in FIG. 6 has selected the exhibit type "Documents" and in particular has selected the document entitled "Report1 James Horrell." Then the selected potential exhibits and the corresponding hyperlink citation (i.e. referenced element) are inserted, via method 200, into the outline at the place of the cursor, FIG. 6A. As previously stated, clicking the document hyperlink within the outline opens the document in the display pane 302. The document is then also listed in the navigation pane 304 of the opened outline. Within the outline display pane 302, deleting a document hyperlink, for example, a transcript, removes the corresponding hyperlink in the navigation pane 304.

Figure 7:
FIG. 7 is an exemplary interface used in the invention.
Figure 7A:
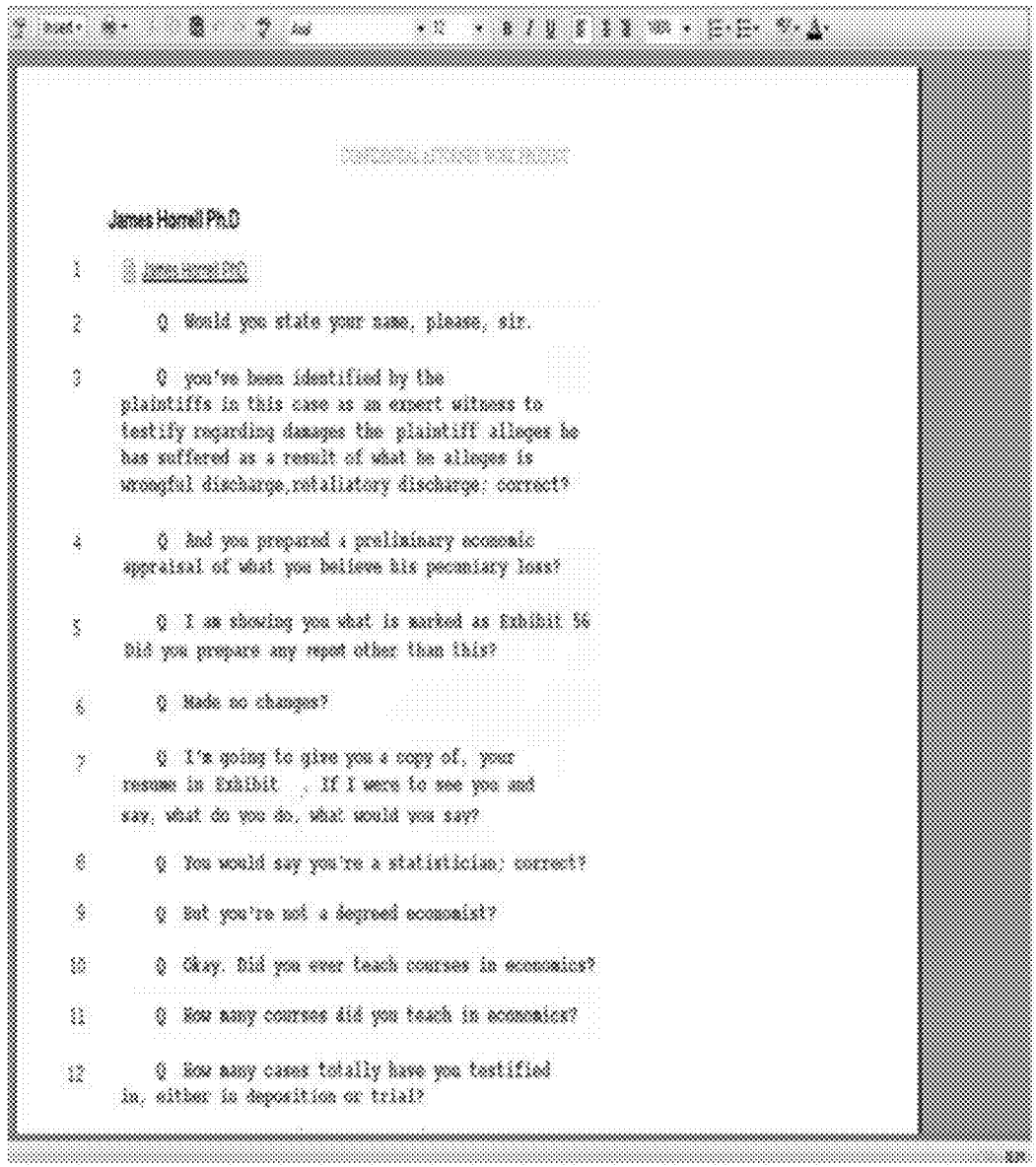
FIG. 7A is an exemplary interface used in the invention.

To insert a full listing of transcript questions on a deponent, a user selects "Insert Transcript Questions" 520, in FIG. 5, which in turn opens an Insert Transcript Questions dialog box, FIG. 7. The user is able to select a single transcript along with the option to include answers to the selected transcript questions. If the user selects "Include Answers," the question/answer pairs from the selected transcript and the corresponding hyperlink citation (i.e. referenced element) are inserted, via method 200, into the outline, FIG. 7A. Clicking the hyperlink opens the transcript in the display pane 302 in a new tab. The transcript is also added to the navigation pane 304. Double-clicking the transcript in the navigation pane 304 opens the transcript in the display pane 302 in a new tab. Deleting the hyperlink in the display pane 302 does not delete the transcript in the navigation pane 304.

Figure 8:
FIG. 8 is an exemplary interface used in the invention.
Figure 9:
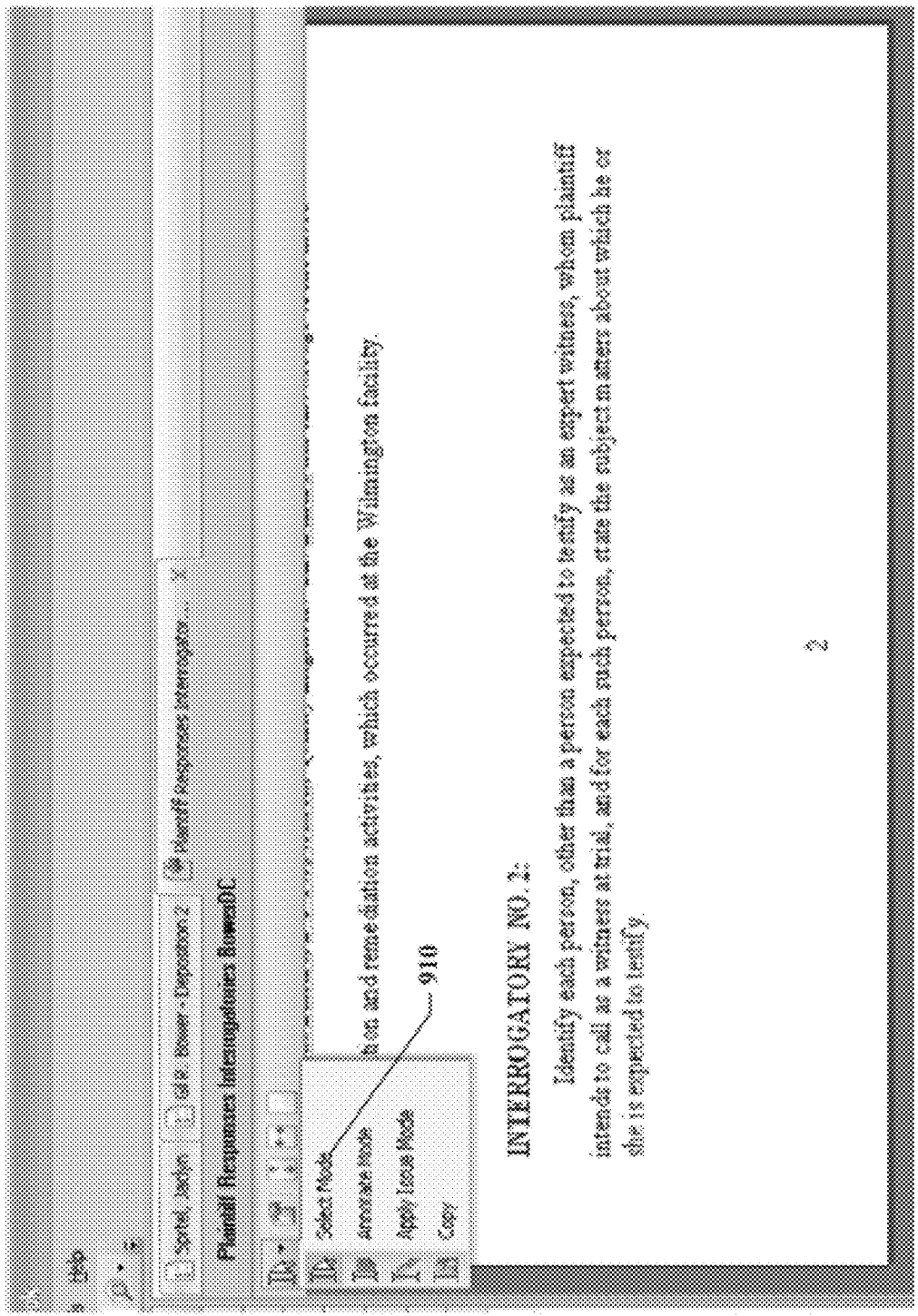
FIG. 9 is an exemplary interface used in the invention.
Figure 10:
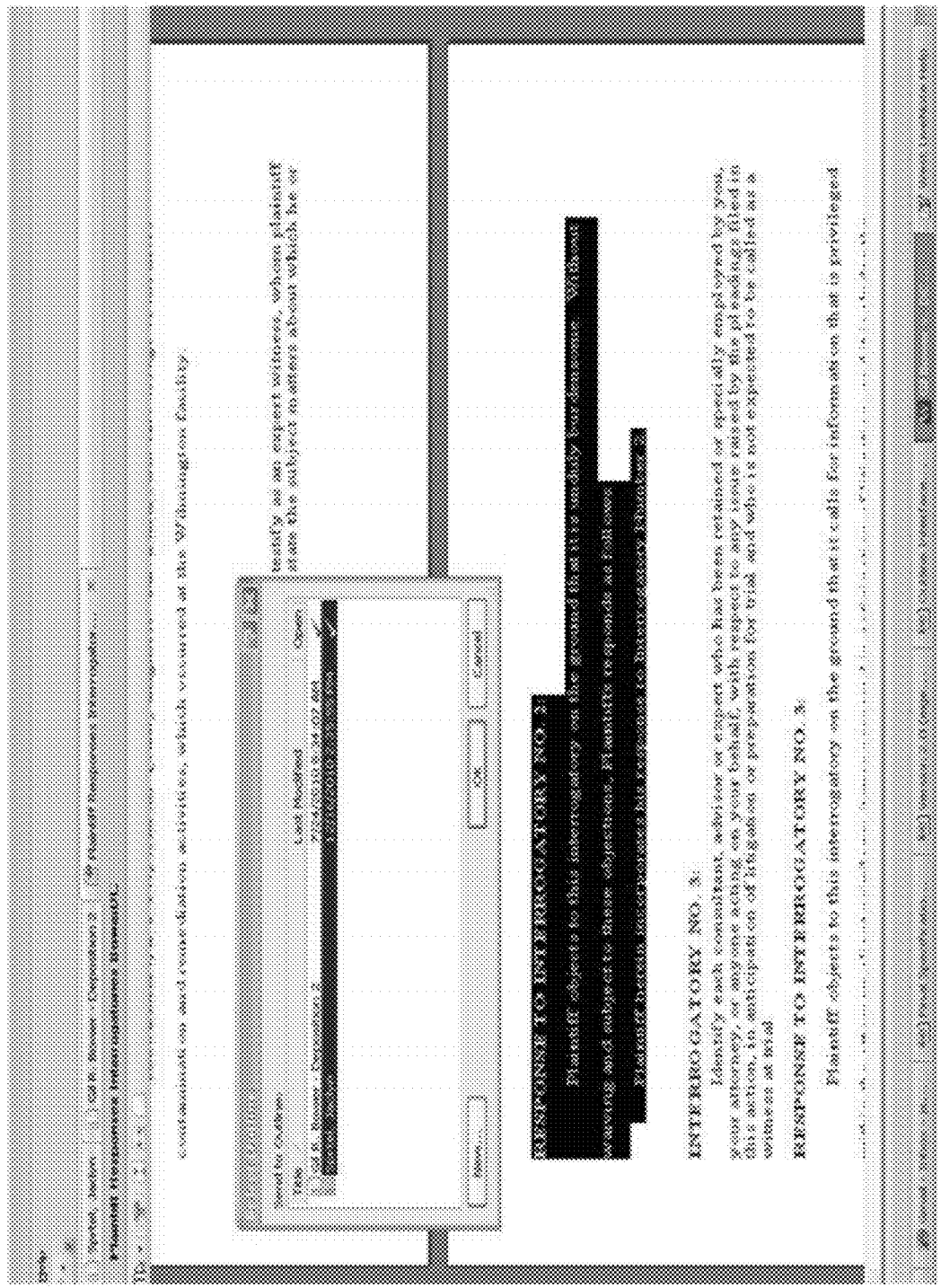
FIG. 10 is an exemplary interface used in the invention.

To insert a WESTLAW® outline, a user selects "Westlaw Outline" 530, in FIG. 5, which in turn opens a Search Westlaw dialog box, FIG. 8. The plus and minus icons open and close the "Table of Contents" hierarchy. The user navigates through the hierarchy and selects the necessary outline. The WESTLAW® outline and the corresponding hyperlink citation (i.e. referenced element) are inserted, via method 200, into the outline. The same navigation pane 304 display and capability are described previously are also applicable to a WESTLAW® outline. In addition, a user may want to continue researching, the "Search Westlaw" tab closes the Search Westlaw dialog box, in FIG. 8, and directs the user to a new or existing WESTLAW® session. If the user finds additional research results within the WESTLAW® session, those results can be exported to the LS software 140 via known print/delivery options in WESTLAW®.

In order for a user to select a portion of text from a source document, the user must first open the source document. Then using the "Select Mode" 910 option, in FIG. 9, a user is able to highlight text, right-click on the highlighted text and select "Send" (not shown) to outline. Once the user selects that "Send" option, a list of outlines appears, in FIG. 10, in which the user decides which outline to insert the highlighted text and corresponding hyperlinked citation. After the selection is made, the highlighted text and hyperlinked citation (i.e. referenced element) is inserted, via method 200, into the selected outline at the previous location of the cursor in the outline. If the cursor is not in the outline, the highlighted text and corresponding hyperlinked citation appears at the end of the outline.

Figure 11:
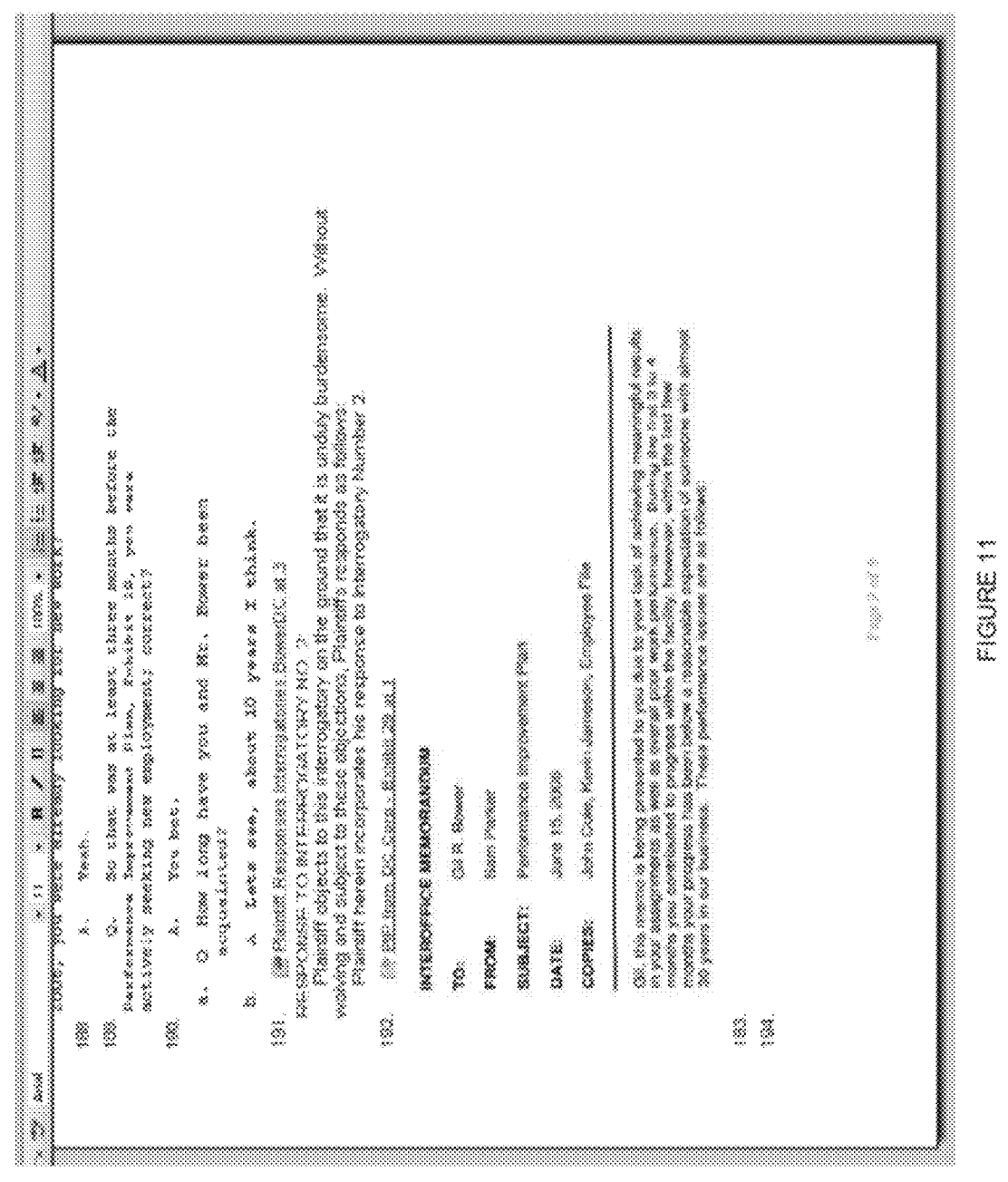

FIG. 11 shows an exemplary outline illustrating instances of referenced elements. The first exemplary referenced element is a selected portion of text from an interrogatory document and its corresponding hyperlinked citation, "Plaintiff Responses Interrogatories BowerDC at 3." The second exemplary referenced element is a selected portion of an image from a memorandum and the corresponding hyperlinked citation "PIP from DC Corp—Exhibit 29 at 1." This functionality allows a user the flexibility to copy and paste various different types of text, images, etc. into an outline (i.e. destination document) while also maintaining a correlation (i.e. a hyperlink associated with a citation) to the actual source document. In addition, each source document is added to the navigation pane 304. Furthermore, when the hyperlink associated with a citation is clicked, the hyperlink navigates the user directly to the location of the citation.

Figure 12:
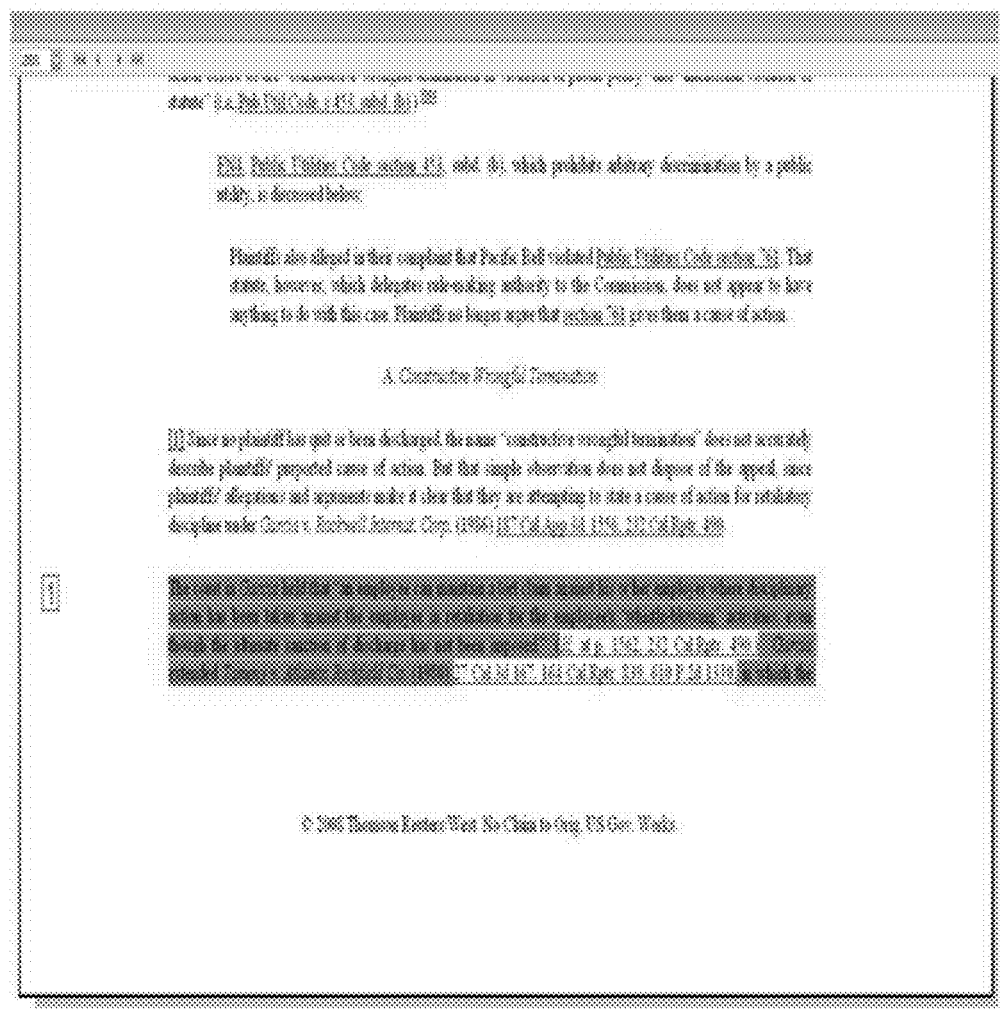
FIG. 12 is an exemplary interface used in the invention.

Within a source document, a user may choose to annotate the text within that document. FIG. 12 depicts an exemplary interface where an attorney has chosen to annotate a certain section within a legal case. Once the attorney annotates this section, a numeral is placed next to the annotation and the text of the annotation may be displayed as a footnote depending on page setup parameters.

Figure 13:
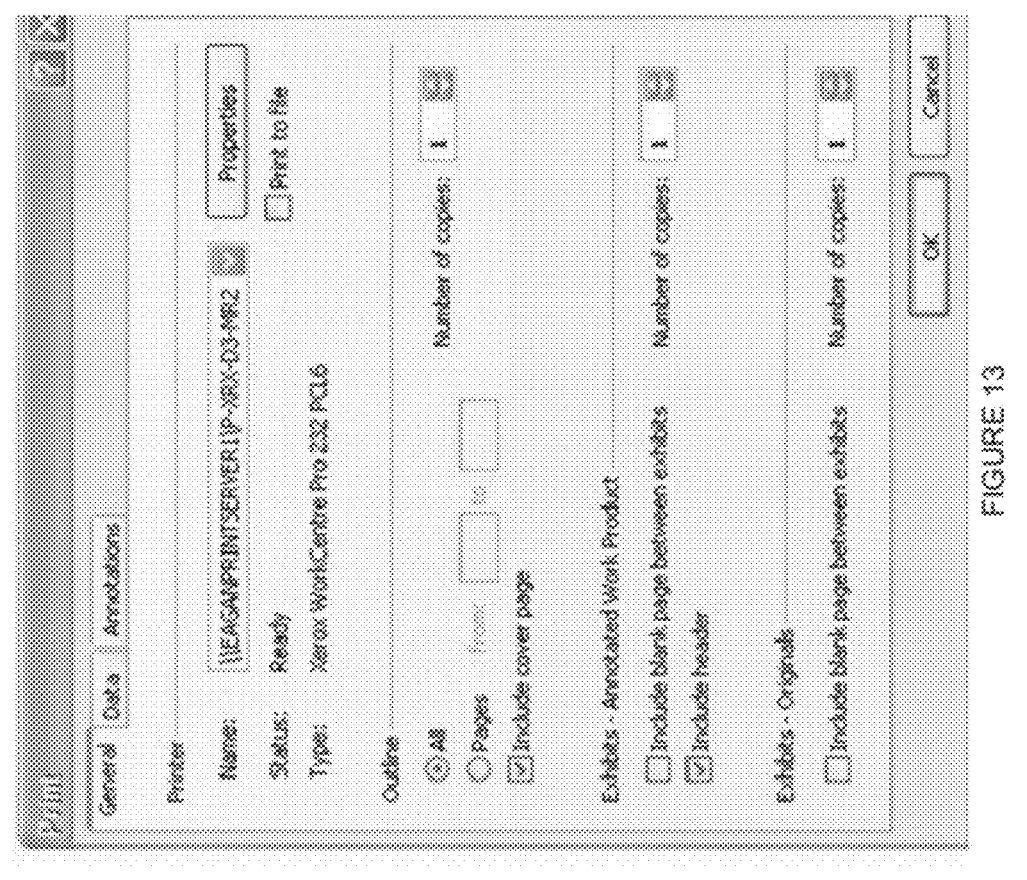
Figure 13A:
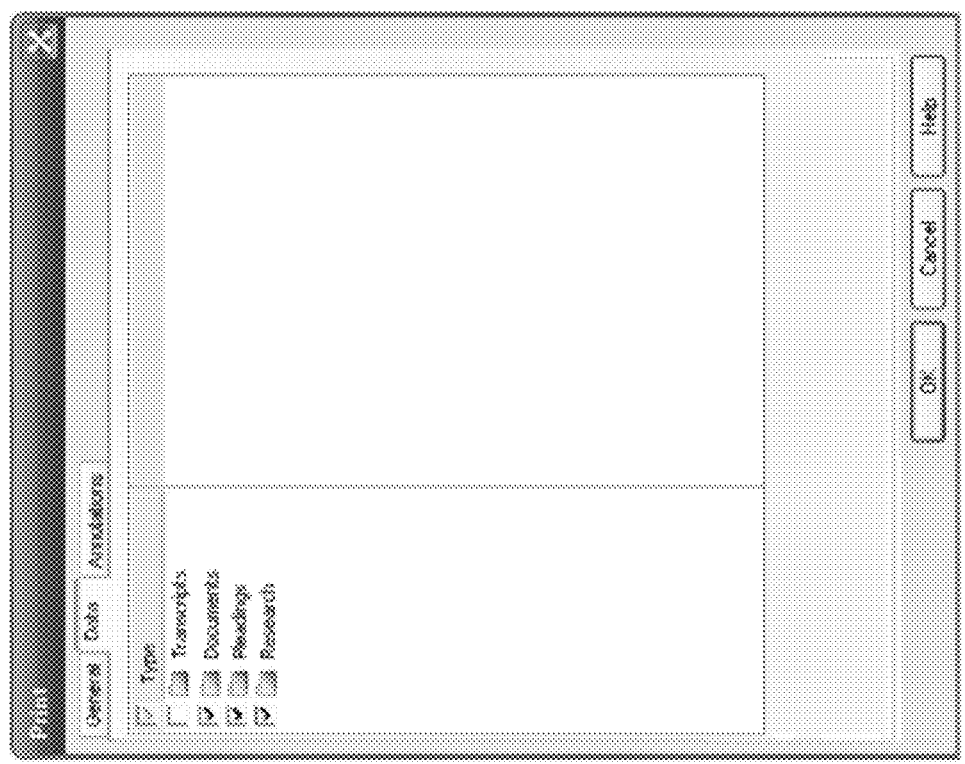
FIG. 13A is an exemplary interface used in the invention.

After a user has completed an outline with the various annotated and non-annotated exhibits that are hyperlinked within the outline, the user may want to print the outline and/or exhibits. FIGS. 13-13B show the different tabs within the print dialog box. The "General" tab, FIG. 13, allows for the option of including a printout, in the single print session, of all the exhibits and/or exhibits and corresponding annotated work product in addition to the outline. A print session occurs when the print dialog box appears and then a user selects the printer parameters and elects to print the documentation. The single print session printout options provide faster and more effective printing. For example, in the single print session, a user selects the number of copies and exhibit preferences, and within moments, the user receives a quick, easy annotated printout to keep and a non-annotated printout to distribute to an adversary. The "Data" tab, FIG. 13A, controls the types of data (i.e. exhibits mentioned in the General tab) to be printed. The "Annotations" tab, FIG. 13B, provides the user the following annotation display/print options: "Display Annotations," "Include Annotation with No Issues" (e.g. a user creates an annotation about the legal issue of damages), and "Display Annotation in Footer."

Figure 14:
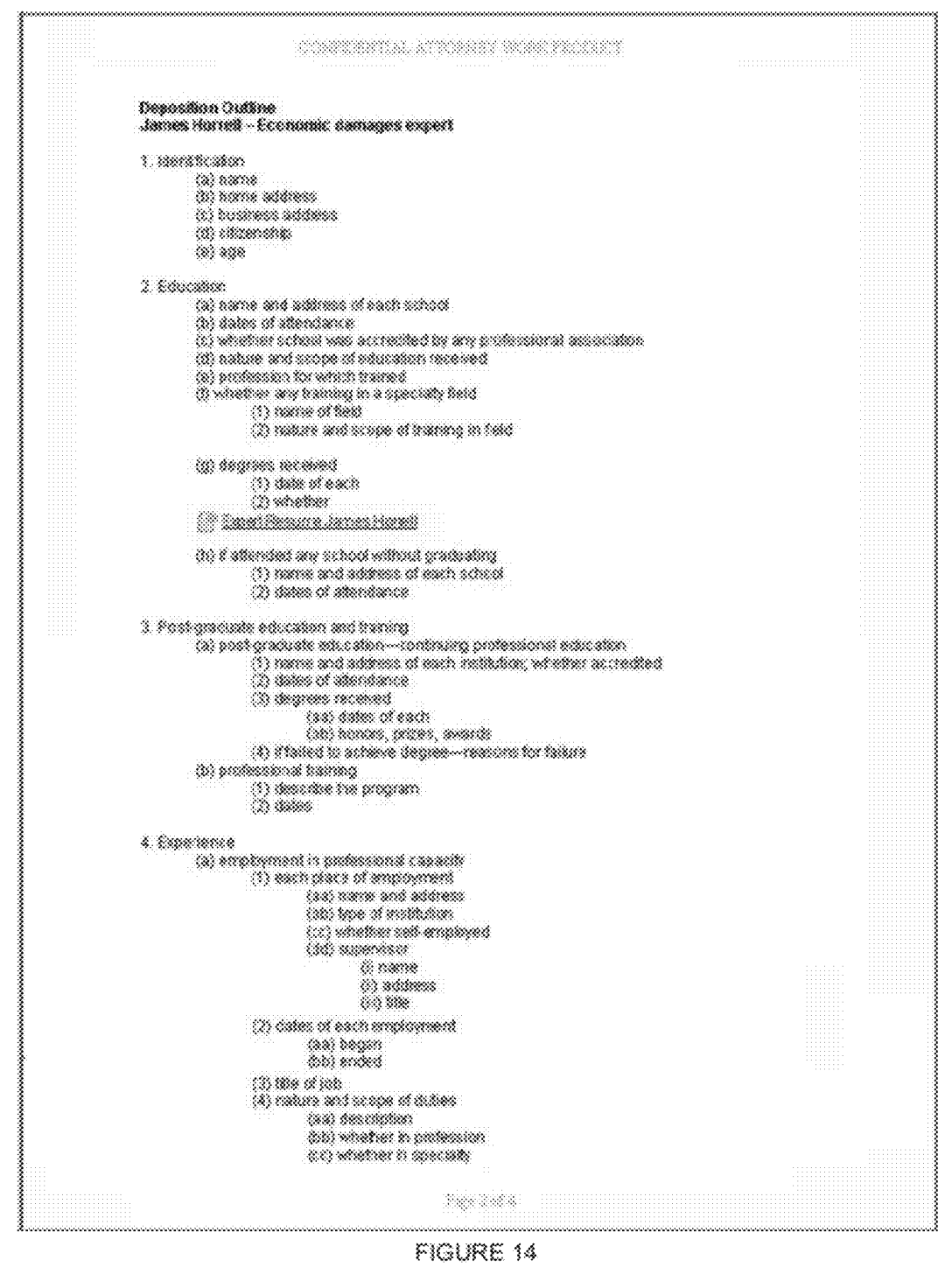

FIG. 14 illustrates an exemplary outline. This outline type is a deposition outline regarding James Horrell, an economic damages expert. The outline contains topics to discuss during the deposition as well as a hyperlink to James Horrell's resume. If the user chooses to print exhibits along with the outline, the user prints the outline in FIG. 14 along with James Horrell's resume, as it was an exhibit linked with the outline. If there were any annotations on the resume and the user opted to print an annotated work product exhibit copy, the user would also receive a copy of the annotated resume.

The embodiments described above and in the claims are intended only to illustrate and teach one or more ways of practicing or implementing the present invention, not to restrict its breadth or scope. For example, the referenced element may be stored elsewhere besides the memory of the access device 130. Any location within the access device 130 where data can be temporarily and/or permanently stored is acceptable. The actual scope of the invention, which embraces all ways of practicing or implementing the teachings of the invention, is defined by the claims and their equivalents.

The invention claimed is:
1. A method comprising:
accessing a source document, the source document associated with a citation;
receiving at least one user-generated annotation and appending into the source document;
generating a corresponding reference identification to the at least one user-generated annotation in the source document;
generating a referenced element comprising a selected portion of the source document and a hyperlink associated with the citation, wherein the selected portion of the source document is at least one of text or image copied from the source document and further comprises the at least one user-generated annotation;

storing a copy of the referenced element in a memory of an access device;

accessing a destination document; and inserting the referenced element into the destination document, wherein the destination document is a work product document; the referenced element is displayed in the destination document as a hyperlink to the source document along with the selected portion of the source document with the at least one user-generated annotation and said inserting is moving a copy of the referenced element from the memory to the destination document.

2. The method of claim 1 wherein the source document and the destination document are accessed via at least one document processing application.

3. The method of claim 1 wherein the source document is a transcript and the selected portion of the source document comprising a portion of the transcript associated with at least one annotated question.

4. The method of claim 1 wherein the source document is a transcript and the selected portion of the source document comprising a portion of the transcript associated with at least one annotated question/answer pair.

5. The method of claim 1 further comprising printing, within a single print session, the destination document and the source document comprising the at least one user-generated annotation.

6. The method of claim 1 further comprising printing, within a single print session, the destination document and the source document not comprising the at least one user-generated annotation.

7. A system comprising:
an access device comprising:
  a processor;
  a memory: and
  at least one document processing application stored on the memory for execution by the processor, the at least one document processing application comprising a set of computer readable instructions executable by the processor, the set of computer readable instructions comprising:
    a first set of computer program code adapted to access a source document, the source document associated with a citation;
    a second set of computer program code, upon execution of the first set of computer program code, adapted to receive at least one user-generated annotation and append into the source document;
    a third set of computer program code, upon execution of the second set of computer program code, adapted to generate a corresponding reference identification to the at least one user-generated annotation in the source document;
    a fourth set of computer program code, upon execution of the third set of computer program code, adapted to generate a referenced element comprising a selected portion of the source document and a hyperlink associated with the citation, wherein the selected portion of the source document is at least one of text or image copied from the source document and further comprises the at least one user-generated annotation;
    a fifth set of computer program code, upon execution of the fourth set of computer program code, adapted to store a copy of the referenced element in a memory of an access device;
    a sixth set of computer program code, upon execution of the fifth set of computer program code, adapted to access a destination document; and
    a seventh set of computer program code adapted to insert the referenced element into a destination document, wherein the destination document is a work product document, the referenced element is displayed in the destination document as a hyperlink to the source document along with the selected portion of the source document with the at least one user-generated annotation and said insert is moving a copy of the referenced element from the memory to the destination document.

8. The access device of claim 7 wherein the source document and the destination document are accessed via a single document processing application.

9. The system of claim 7 wherein the source document is a transcript and the selected portion of the source document comprising a portion of the transcript associated with at least one annotated question, and the destination document is an outline document.

10. The system of claim 7 wherein the source document is a transcript and the selected portion of the source document comprising a portion of the transcript associated with at least one annotated question/answer pair, and the destination document is an outline document.

11. A non-transitory, computer usable medium comprising:
a first set of computer program code adapted to access a source document, the source document associated with a citation;
a second set of computer program code, upon execution of the first set of computer program code, adapted to receive at least one user-generated annotation and append into the source document;
a third set of computer program code, upon execution of the second set of computer program code, adapted to generate a corresponding reference identification to the at least one user-generated annotation in the source document;
a fourth set of computer program code,
adapted to generate a referenced element comprising a selected portion of the source document and a hyperlink associated with the citation, wherein the selected portion of the source document is at least one of text or image copied from the source document and further comprises the at least one user-generated annotation;
a fifth set of computer program code, upon execution of the fourth set of computer program code, adapted to store a copy of the referenced element in a memory of an access device;
a sixth set of computer program code, upon execution of the fifth set of computer program code, adapted to access a destination document; and
a seventh set of computer program code adapted to insert the referenced element into a destination document, wherein the destination document is a work product document, the referenced element is displayed in the destination document as a hyperlink to the source document along with the selected portion of the source document with the at least one user-generated annotation and said insert is moving a copy of the referenced element from the memory to the destination document.

12. The non-transitory, computer usable medium of claim 11 wherein the source document and the destination document are accessed via at least one document processing application.

13. The non-transitory, computer usable medium of claim 11 wherein the source document is a transcript and the selected portion of the source document comprising a portion of the transcript associated with at least one question, and the destination document is an outline document.

14. The non-transitory, computer usable medium of claim 11 wherein the source document is a transcript and the selected portion of the source document comprising a portion of the transcript associated with at least one question/answer pair, and the destination document is an outline document.

* * * * *